(12) United States Patent
Chen

(10) Patent No.: US 12,445,136 B2
(45) Date of Patent: Oct. 14, 2025

(54) LOOP FILTER, TIMING RECOVERY METHOD AND APPARATUS

(71) Applicant: SANECHIPS TECHNOLOGY CO., LTD, Guangdong (CN)

(72) Inventor: Sheng Chen, Guangdong (CN)

(73) Assignee: SANECHIPS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/026,613

(22) PCT Filed: Sep. 16, 2021

(86) PCT No.: PCT/CN2021/118882
§ 371 (c)(1),
(2) Date: Mar. 16, 2023

(87) PCT Pub. No.: WO2022/057867
PCT Pub. Date: Mar. 24, 2022

(65) Prior Publication Data
US 2024/0030928 A1    Jan. 25, 2024

(30) Foreign Application Priority Data
Sep. 16, 2020    (CN) .......................... 202010976613.4

(51) Int. Cl.
*H03L 7/093* (2006.01)
*H04L 7/00* (2006.01)

(52) U.S. Cl.
CPC ............ *H03L 7/093* (2013.01); *H04L 7/0016* (2013.01)

(58) Field of Classification Search
CPC ....... H03L 7/085; H03L 7/093; H04L 7/0054; H04L 7/0062; H04L 7/0016; H04L 7/0079; H04L 7/0087
See application file for complete search history.

(56) References Cited

U.S. PATENT DOCUMENTS 7,519,137 B2 *    4/2009    Murray ................ H04L 7/0062
                                                                 375/376
9,251,811 B1    2/2016    Furrer et al.
(Continued)

FOREIGN PATENT DOCUMENTS

CN    101170398 A    4/2008
CN    101729236 A    6/2010
(Continued)

OTHER PUBLICATIONS

WIPO, International Search Report issued on Dec. 14, 2021.
(Continued)

*Primary Examiner* — Betsy Deppe
(74) *Attorney, Agent, or Firm* — Li & Cai Intellectual Property (USA) Office

(57) ABSTRACT

A loop filter, and a timing recovery method and apparatus are provided. The loop filter includes: N input terminals configured to receive N first signals; where N is any integer greater than or equal to 2; a source filter, including: an integral signal terminal and an addition terminal; a first gain processing module configured to perform first gain processing on the N first signals to obtain a second signal, and output the second signal to the addition terminal; a second gain processing module configured to perform second gain processing on the N first signals to obtain a third signal, and output the third signal to the integral signal terminal; and a source filter configured to integrate the third signal received by the integral signal terminal to obtain a fourth signal, and obtain a fifth signal according to the fourth signal and the second signal received by the addition terminal.

6 Claims, 7 Drawing Sheets

(56) References Cited

U.S. PATENT DOCUMENTS

| | | |
|---|---|---|
| 9,313,017 B1 | 4/2016 | Liao et al. |
| 9,544,128 B2 * | 1/2017 | Jiang et al. |
| 9,633,687 B2 * | 4/2017 | Furrer .................... H04L 25/05 |
| 9,780,796 B2 * | 10/2017 | Kou ........................ H03L 7/093 |
| 10,382,047 B1 * | 8/2019 | Li ........................... H03L 7/093 |
| 2015/0092898 A1 | 4/2015 | Lee et al. |

FOREIGN PATENT DOCUMENTS

| | | |
|---|---|---|
| CN | 101854497 A | 10/2010 |
| CN | 105122720 A | 12/2015 |
| CN | 108809869 A | 11/2018 |
| CN | 111245544 A | 6/2020 |
| WO | WO03013051 A2 | 2/2003 |

OTHER PUBLICATIONS

European Patent Office, the Extended European Search Report dated Sep. 19, 2024, for corresponding EP application No. 21868689.7.

* cited by examiner

LOOP FILTER, TIMING RECOVERY METHOD AND APPARATUS

This application claims priority from Chinese patent application No. 202010976613.4 filed on Sep. 16, 2020, the entirety of which is incorporated herein by reference.

TECHNICAL FIELD

Embodiments of the present application relate to the field of receivers in communication systems.

BACKGROUND

In a digital communication system, since data is typically transferred from one device to another in an asynchronous manner, the receiver needs to extract clock information from the received signal to adjust local sampling frequency and phase.

A timing recovery loop of the receiver typically includes: an analog-to-digital converter (ADC), an adaptive equalizer, a slicer, a timing error detector (TED), a loop filter, an oscillator (such as a voltage controlled oscillator (VCO) or a numerically controlled oscillator (NCO)), as shown in FIG. 1. In the existing techniques, there are two options for the input signal of the timing error detector: one is the input signal of the adaptive equalizer (i.e., after output from the ADC output), and such a timing error detector is referred to as ADC-TED hereinafter; and the other is the input signal of the slicer (i.e., after output from the adaptive equalizer), and such a timing error detector is referred to as Slicer-TED hereinafter. Both timing error detectors have advantages and disadvantages. No matter which type of timing error detector is adopted, it is hard to ensure a stable receiving performance.

SUMMARY

Embodiments of the present application provide a loop filter, and a timing recovery method and apparatus.

In a first aspect, an embodiment of the present application provides a loop filter, including: N input terminals configured to receive N first signals, where N is any integer greater than or equal to 2; a source filter, including: an integral signal terminal and an addition terminal; a first gain processing module configured to perform first gain processing on the N first signals to obtain a second signal, and output the second signal to the addition terminal; and a second gain processing module configured to perform second gain processing on the N first signals to obtain a third signal, and output the third signal to the integral signal terminal; wherein the source filter is configured to integrate the third signal received by the integral signal terminal to obtain a fourth signal, and obtain a fifth signal according to the fourth signal and the second signal received by the addition terminal.

In a second aspect, an embodiment of the present application provides a timing recovery apparatus, including: a timing error detection module and a loop filter; wherein the timing error detection module is configured to determine N first signals, and input the N first signals to N input terminals of the loop filter; wherein each first signal is a timing error message, and N is any integer greater than or equal to 2; wherein the loop filter includes: the N input terminals, a source filter, a first gain processing module, and a second gain processing module; the source filter includes: an integral signal terminal and an addition terminal; the N input terminals are configured to receive N first signals; the first gain processing module is configured to perform first gain processing on the N first signals to obtain a second signal, and output the second signal to the addition terminal; the second gain processing module is configured to perform second gain processing on the N first signals to obtain a third signal, and output the third signal to the integral signal terminal; and the source filter is configured to integrate the third signal received by the integral signal terminal to obtain a fourth signal, and obtain a fifth signal according to the fourth signal and the second signal received by the addition terminal.

In a third aspect, an embodiment of the present application provides a timing recovery method, including: determining N first signals, wherein each first signal is a timing error message, and N is any integer greater than or equal to 2; performing first gain processing on the N first signals to obtain a second signal; performing second gain processing on the N first signals to obtain a third signal; and integrating the third signal to obtain a fourth signal and obtaining a fifth signal by adding the second signal with the fourth signal.

In a fourth aspect, an embodiment of the present application provides a timing recovery method applied to any timing recovery apparatus as described above, where N is 2, the method including: performing a first timing recovery on a received eighth signal using a $2^{nd}$ timing error detector, so that a sampling phase of an analog-to-digital converter is converged to a first target phase, training an adaptive equalizer during the first timing recovery, and opening a first switch and a second switch; performing, after the training of the adaptive equalizer is finished, a second timing recovery on the received eighth signal using a $1^{st}$ timing error detector and the $2^{nd}$ timing error detector jointly, so that the sampling phase of an analog-to-digital converter is converged to a second target phase; performing a third timing recovery on a received ninth signal using the $1^{st}$ timing error detector, stopping updating an equalization coefficient of the adaptive equalizer during the third timing recovery, and closing the first switch to measure a mean value of a $2^{nd}$ original timing error message output from the $2^{nd}$ timing error detector, wherein the ninth signal has an autocorrelation characteristic different from the eighth signal; and after measuring the mean value of the $2^{nd}$ original timing error message output from the $2^{nd}$ timing error detector, performing a fourth timing recovery using the $1^{st}$ timing error detector and the $2^{nd}$ timing error detector jointly, further updating the equalization coefficient of the adaptive equalizer during the fourth timing recovery, opening the first switch, and closing the second switch to output the mean value of the $2^{nd}$ original timing error message, and subtracting the mean value from the $2^{nd}$ original timing error message to obtain a $2^{nd}$ timing error message.

In the embodiments of the present application, N input signals of the loop filter are provided so that the loop filter has 2 N independent configurable gain parameters, and advantages of the N input signals can be fully combined.

In the timing recovery apparatus provided in the embodiments of the present application, timing recovery is performed using N timing error messages jointly so that advantages and disadvantages of the N timing error messages are complemented, and the performance of the timing recovery is improved. Moreover, N input signals of the loop filter are provided so that the loop filter has 2 N independent configurable gain parameters, and advantages of the N timing error messages can be fully combined, thereby further improving the performance of the timing recovery.

In the timing recovery method provided in the embodiments of the present application, after the sampling phase of the analog-to-digital converter is converged to the second target phase, merely the $1^{st}$ timing error detector is used to perform the third timing recovery on the received ninth signal, and since the $1^{st}$ timing error detector extracts the $1^{st}$ original timing error message based on the second digital signal output from the adaptive equalizer, the inter-symbol interference (ISI) of the second digital signal tends to be 0, so that no great change occurs in a stable phase before and after a change in the autocorrelation characteristic of the received signal, that is, the stable phase is still stabilized in the target phase. Moreover, updating the equalization coefficient of the adaptive equalizer is stopped during the third timing recovery, so that the $1^{st}$ timing error detector is not influenced by the adaptive update of the equalization coefficient of the adaptive equalizer, and the sampling phase of the analog-to-digital converter is still stabilized in the second target phase during the third timing recovery. Therefore, the target measurement is carried out during the third timing recovery so that the target measurement can last for a longer time with a higher precision.

DETAIL DESCRIPTION OF EMBODIMENTS

Figure 1:
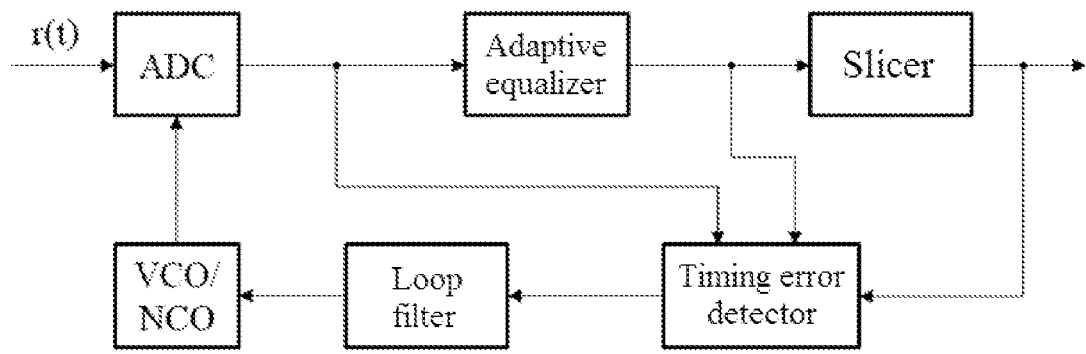
FIG. 1 is a schematic structural diagram of a timing recovery loop of an existing receiver.

In order to make those skilled in the art better understand the technical solutions of the present application, the loop filter, and the timing recovery method and apparatus of the present application will be described below in detail in conjunction with the accompanying drawings.

Example embodiments will be described more sufficiently below with reference to the accompanying drawings, but which may be embodied in different forms and should not be construed as limited to the embodiments set forth herein. Rather, these embodiments are provided so that the present application will become thorough and complete, and will fully convey the scope of the present application to those skilled in the art.

The embodiments of the present application and features thereof may be combined with each other as long as they are not contradictory.

As used herein, the term "and/or" includes any and all combinations of at least one associated listed item.

The terminology used herein is for the purpose of describing specific embodiments only and is not intended to limit the present application. As used herein, the singular forms "a", "an" and "the" are intended to include the plural forms as well, unless the context clearly indicates otherwise. It will be further understood that as used herein, the terms "comprise" and/or "consist of . . . " specify the presence of the stated features, integers, steps, operations, elements, and/or components, but do not preclude the presence or addition of at least one other feature, integer, step, operation, element, component, and/or group thereof. In addition, when ordinal terms such as "first", "second", and the like are used herein, they do not denote any order or sequence, but rather are used to distinguish between different entities or steps, unless the context clearly dictates otherwise.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the existing art and the present application, and will not be interpreted in an idealized or overly formal sense unless expressly so defined herein.

As mentioned in the background part, the first type of timing error detector (ADC-TED) adopts the input signal of the adaptive equalizer as the input signal. In this case, the input signal of the adaptive equalizer is only influenced by sampling phase adjustment of the ADC, but not influenced by adaptive update of the equalizer coefficient. However, due to severe ISI (Inter Symbol Interference) of the input signal of the adaptive equalizer, the timing error message extracted from the input signal of the adaptive equalizer has large self-noise, resulting in large phase jitter, which leads to poor reception performance. In contrast, the second type of timing error detector (Slicer-TED) adopts the input signal of the slicer as the input signal. In this case, since most ISI is removed from the input signal of the slicer, the timing error message extracted from the input signal of the slicer has less phase jitter, but the input signal of the slicer is influenced by both sampling phase adjustment of the ADC and adaptive update of the equalizer coefficient, causing mutual influence between the timing recovery and the adaptive equalization, slow drift of the sampling phase, and finally unstable reception performance.

Figure 2:
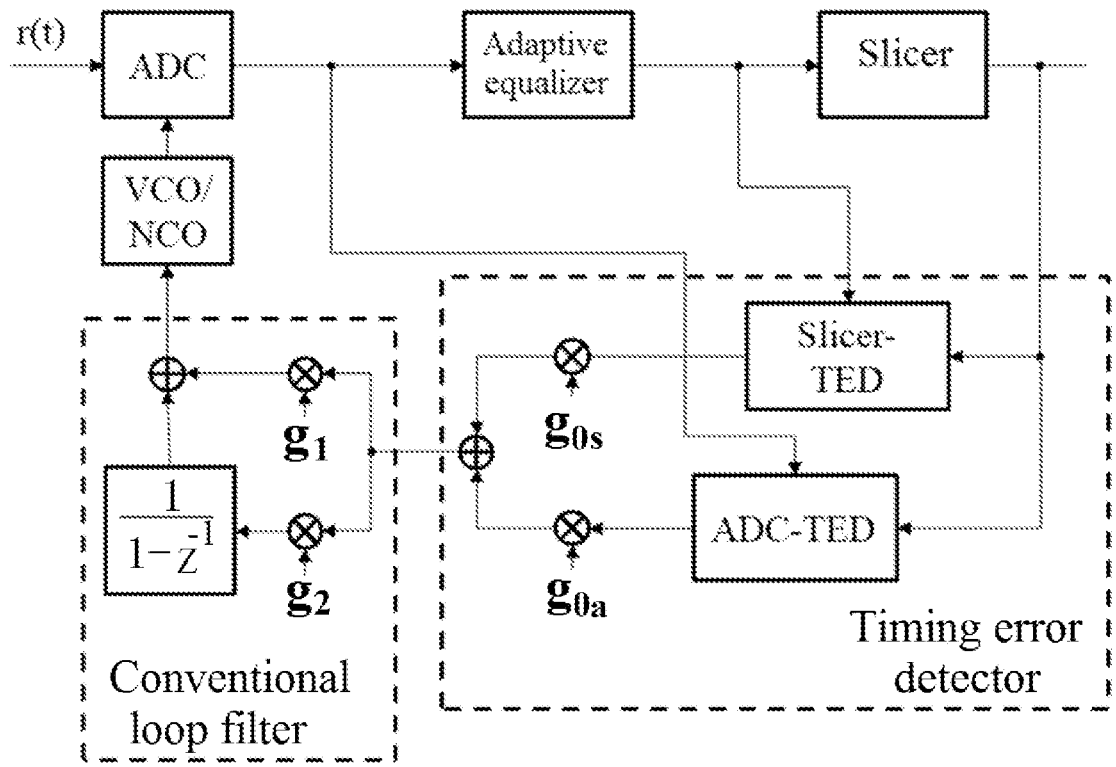
FIG. 2 is a schematic diagram of a timing recovery loop combining an ADC-TED and a Slicer-TED.

It is noted that the advantages and disadvantages of the ADC-TED and the Slicer-TED are complementary to one another, so a natural idea is to use the ADC-TED and the Slicer-TED in combination. However, since the conventional loop filter has merely a single input signal, one solution is to multiply output signals of the ADC-TED and the Slicer-TED by a certain gain and add them together (i.e., linear combination), and then transmit the result to the conventional loop filter. FIG. 2 is a schematic diagram of a timing recovery loop combining an ADC-TED and a Slicer-TED under the above conditions. Although this solution implements combined use of the ADC-TED and the Slicer-TED to some extent, the advantages of the ADC-TED and the Slicer-TED are not fully combined, because although there are four configurable gain parameters ($g0_s$, $g0_a$, $g_1$, and $g_2$) in FIG. 2, after equivalent transformation of FIG. 2 (assuming $g_{0_s} \ne 0$) into FIG. 3, there are actually merely three independently configurable gain parameters: $g_0'$, $g_1'$, and $g_2'$.

Figure 3:
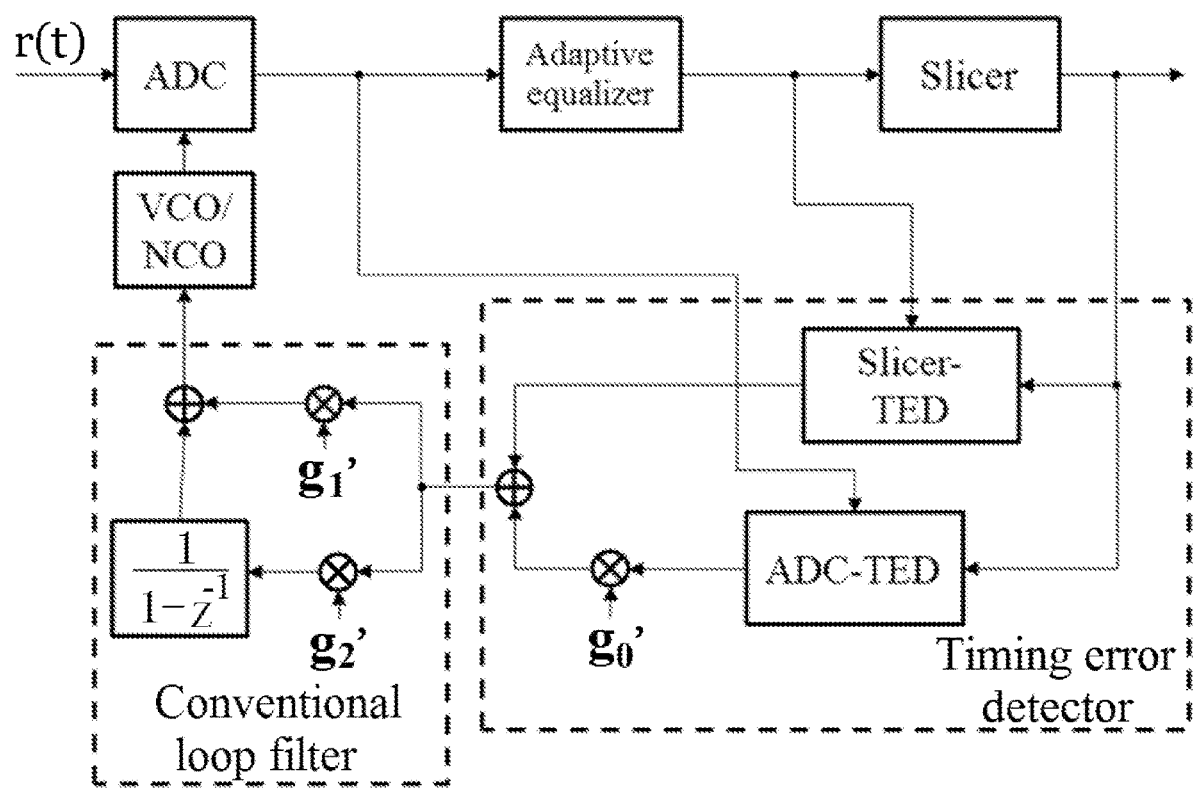
FIG. 3 is a schematic diagram of an equivalent timing recovery loop of FIG. 2.

FIG. 3 is a schematic diagram of an equivalent timing recovery loop of FIG. 2. In FIG. 3, ratios of the ADC-TED and the Slicer-TED can only be adjusted by $g_0'$, and in order to suppress the large self-noise of the ADC-TED, $g_0'$ should be much less than 1. As such, however, the Slicer-TED will dominant, and the influence by the adaptive update of the equalizer coefficient will still be present, which may result in unstable reception performance. Therefore, $g_0'$ should not be too small, but then the self-noise of the ADC-TED cannot be suppressed sufficiently.

In addition, to prevent error propagation of the decision feedback equalizer, some communication systems use the Tomlinson-Harashima Precoding (THP) technique. During system startup, after the system is switched to the THP mode, a transmitter firstly sends a pulse amplitude modulation (PAM) 2 training signal of the THP, and then a receiver carries out timing recovery and trains the adaptive equalizer. Only after the training is completed, the transmitter begins to send a PAM16 data signal of the THP. In this case, use of the ADC-TED may introduce new problems.

Transmission features of the timing error detector (commonly referred to as S-Curve) is related to autocorrelation characteristics of the received signal. During the above starting process, since the PAM2 training signal of the THP has an autocorrelation characteristic different from that of the PAM16 data signal of the THP, the stable phase of the ADC-TED is greatly changed; and after entering the PAM16 data signal phase of the THP, the timing recovery will be converged to a new stable phase, resulting in reduced performance of the equalizer and even unstable reception performance.

It should be noted that although the loop filter, and the timing recovery method and apparatus in the embodiment of the present application are proposed based on the joint use of two timing error detectors, i.e., the ADC-TED and the Slicer-TED, the present application may be also applicable to a scenario of timing recovery using three or more timing error detectors jointly.

Although the loop filter in the embodiment of the present application is proposed based on a scenario of timing recovery jointly using two timing error detectors, i.e., the ADC-TED and the Slicer-TED, the loop filter may be also applicable to other application scenarios, for example, any scenario in a phase lock loop that involves joint use of two or more phase discriminators.

Before describing the loop filter, and the timing recovery method and apparatus of the present application, functions of various components in the timing recovery loop will be described first.

As shown in FIGS. 1 to 5, the ADC is configured to sample received analog input signals according to a sampling frequency and a sampling phase to obtain a first digital signal. The sampling frequency of the ADC may be one, two, or any other oversampling multiple (times) of the symbol rate. In order to increase the accuracy of the decision symbol and reduce the bit error rate, an oversampling multiple is usually adopted.

The adaptive equalizer is configured to perform equalization processing on the first digital signal to obtain a second digital signal.

The slicer is configured to map the second digital signal to a corresponding output signal, i.e., to one of a plurality of known possible symbol values.

The timing error detector includes an ADC-TED and a Slicer-TED. The ADC-TED is configured to determine timing error messages (timing error information) from the first digital signal and an output signal of the slicer; and the Slicer-TED is configured to determine timing error messages based on the second digital signal and an output signal of the slicer.

The loop filter is configured to filter the timing error messages to obtain filtered timing error messages.

The oscillator is configured to control a sampling phase of the ADC according to the filtered timing error messages.

According to a first aspect, an embodiment of the present application provides a loop filter, including: N input terminals configured to receive N first signals, where N is an integer greater than or equal to 2; a source filter, including: an integral signal terminal and an addition terminal; a first gain processing module configured to perform first gain processing on the N first signals to obtain a second signal, and output the second signal to the addition terminal; and a second gain processing module configured to perform second gain processing on the N first signals to obtain a third signal, and output the third signal to the integral signal terminal. The source filter is configured to integrate the third signal received by the integral signal terminal to obtain a fourth signal, and obtain a fifth signal according to the fourth signal and the second signal received by the addition terminal.

In some exemplary embodiments, the first gain processing module includes: N first multipliers and a first adder. A $j^{th}$ first multiplier is configured to multiply a $j^{th}$ first signal by a $j^{th}$ gain parameter to obtain a $j^{th}$ sixth signal, where j is any integer greater than or equal to 1 and less than or equal to N. The first adder is configured to add up N sixth signals to obtain the second signal.

In some exemplary embodiments, the second gain processing module includes: N second multipliers and a second adder. A $j^{th}$ second multiplier is configured to multiply a $j^{th}$ first signal by a $(j+N)^{th}$ gain parameter to obtain a $j^{th}$ seventh signal, where j is any integer greater than or equal to 1 and less than or equal to N. The second adder is configured to add up N seventh signals to obtain the third signal.

In some exemplary embodiments, the source filter further includes: an integrator and a third adder. The integrator is configured to integrate the third signal to obtain a fourth signal. The third adder is configured to add the second signal and the fourth signal to obtain a fifth signal.

In some exemplary embodiments, each first signal is a timing error message, and the fifth signal is a filtered timing error message.

It should be noted that the loop filter in the embodiments of the present application may be applicable to a scenario in which two or more timing error detectors are used jointly, or a scenario in a phase lock loop that involves joint use of two or more phase discriminators, or any other scenario that involves joint use of two or more input signals, which is not specifically limited in the embodiments of the present application.

In the embodiments of the present application, N input signals of the loop filter are provided so that the loop filter has 2 N independent configurable gain parameters, and advantages of the N input signals can be fully combined.

Figure 4:
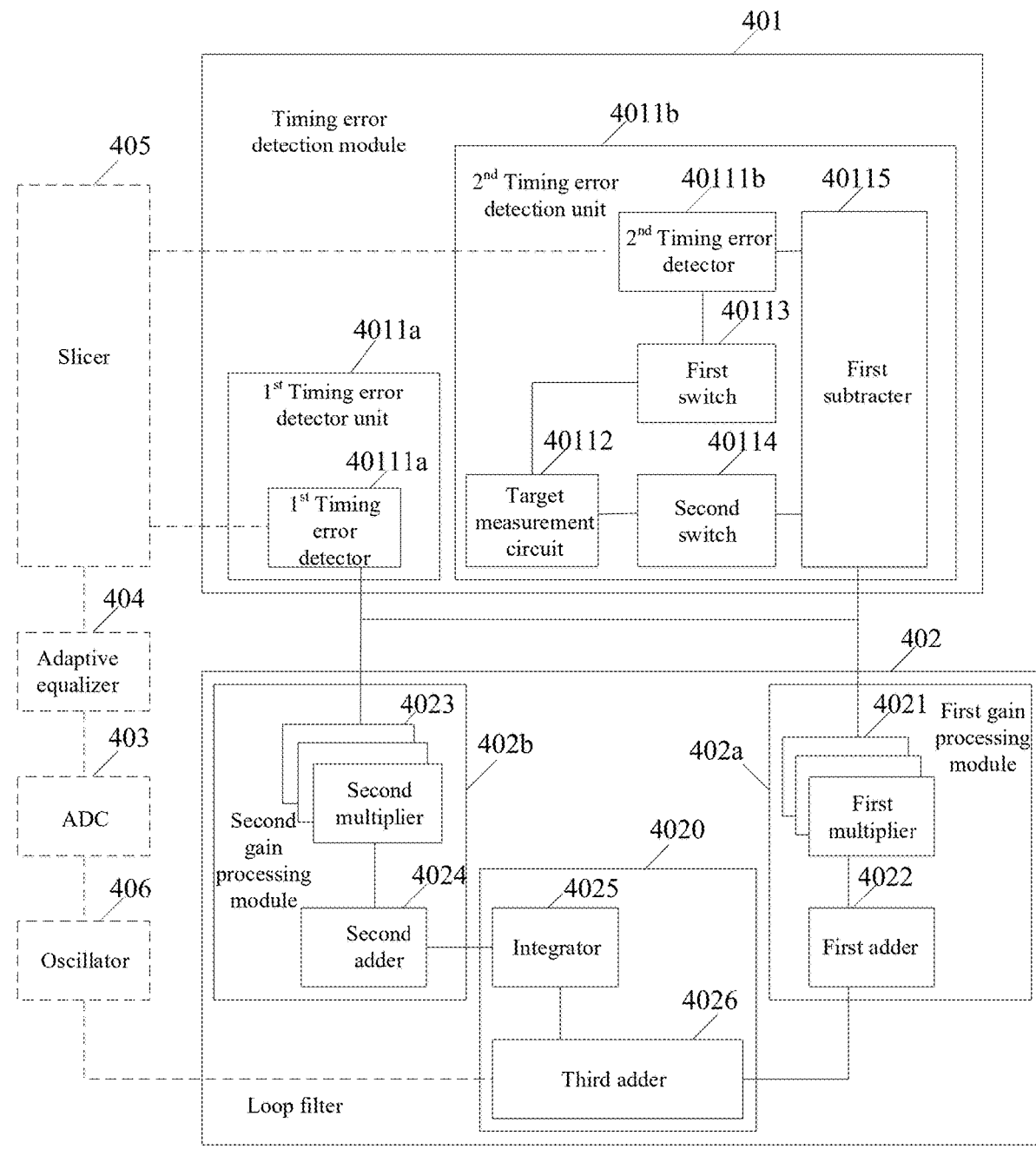
FIG. 4 is a block diagram of a timing recovery apparatus according to an embodiment of the present application.

FIG. 4 is a block diagram of a timing recovery apparatus according to another embodiment of the present application.

According to a second aspect and referring to FIG. 4, another embodiment of the present application provides a timing recovery apparatus, including: a timing error detection module 401 and a loop filter 402.

The timing error detection module 401 is configured to determine N first signals, and input the N first signals to N input terminals of the loop filter. Each first signal is a timing error message (timing error information), and N is any integer greater than or equal to 2.

The loop filter 402 includes: the N input terminals, a source filter 4020, a first gain processing module 402a, and a second gain processing module 402b. The source filter 4020 includes: an integral signal terminal and an addition terminal. The N input terminals are configured to receive N first signals. The first gain processing module 402a is configured to perform first gain processing on the N first signals to obtain a second signal, and output the second signal to the addition terminal. The second gain processing module 402b is configured to perform second gain processing on the N first signals to obtain a third signal, and output the third signal to the integral signal terminal. The source filter 4020 is configured to integrate the third signal received by the integral signal terminal to obtain a fourth signal, and obtain a fifth signal according to the fourth signal and the second signal received by the addition terminal.

In some exemplary embodiments, the first gain processing module 402a includes: N first multipliers 4021 and a first adder 4022. A $j^{th}$ first multiplier 4021 is configured to multiply a $j^{th}$ first signal by a $j^{th}$ gain parameter to obtain a $j^{th}$ sixth signal, where j is any integer greater than or equal to 1 and less than or equal to N. The first adder 4022 is configured to add up N sixth signals to obtain the second signal.

In some exemplary embodiments, the second gain processing module 402b includes: N second multipliers 4023 and a second adder 4024. A $j^{th}$ second multiplier 4023 is configured to multiply a $j^{th}$ first signal by a $(j+N)^{th}$ gain parameter to obtain a $j^{th}$ seventh signal, where j is any integer greater than or equal to 1 and less than or equal to N. The second adder 4024 is configured to add up N seventh signals to obtain the third signal.

In some exemplary embodiments, the source filter 4020 includes: an integrator 4025 and a third adder 4026. The integrator 4025 is configured to integrate the third signal to obtain a fourth signal. The third adder 4026 is configured to add the second signal and the fourth signal to obtain a fifth signal, i.e., a filtered timing error message.

It should be noted that the loop filter 402 includes two branches: a ratio branch and an integral branch. The ratio branch includes: the N first multipliers 4021 and the first adder 4022; and the integral branch includes: the N second multipliers 4023, the second adder 4024, and the integrator 4025.

The loop filter 402 has N input signals (i.e., N first signals or timing error messages), and 2 N independently configurable gain parameters, of which N gain parameters belong to the ratio branch, and the other N gain parameters belong to the integral branch. With these 2 N independently configurable gain parameters, the advantages of the N timing error messages are fully combined.

In some exemplary embodiments, the timing error detection module 401 includes: N timing error detection units, e.g., $1^{st}$ timing error detection unit 4011a and $2^{nd}$ timing error detection unit 4011b shown in FIG. 4. An $i^{th}$ timing error detection unit is configured to determine an $i^{th}$ first signal, where i is any integer greater than or equal to 1 and less than or equal to N.

In other words, N timing error detection units are jointly used for timing recovery, that is, N first signals output from the N timing error detection units are transmitted to the loop filter for timing recovery. Since the loop filter has N input signals, output signals (i.e., N first signals) from the N timing error detection units, respectively, and 2 N independently configurable gain parameters, the advantages of the N timing error detection units are fully combined.

In some exemplary embodiments, the $i^{th}$ timing error detection unit (e.g., the $1^{st}$ timing error detection unit 4011a in FIG. 4) includes: an $i^{th}$ timing error detector (e.g., the $1^{st}$ timing error detector 40111a in FIG. 4). The $i^{th}$ timing error detector is configured to determine an $i^{th}$ original first signal as the $i^{th}$ first signal.

In some exemplary embodiments, the $i^{th}$ timing error detection unit (e.g., the $2^{nd}$ timing error detection unit 4011b in FIG. 4) includes: an $i^{th}$ timing error detector (e.g., the $2^{nd}$ timing error detector 40111b in FIG. 4), a target measurement circuit 40112, a first switch 40113, a second switch 40114, and a first subtracter 40115. The $i^{th}$ timing error detector is configured to determine an $i^{th}$ original first signal. The target measurement circuit 40112 is configured to measure a mean value of the $i^{th}$ original first signal. The first switch 40113 has one end connected to an output of the $i^{th}$ timing error detector, and the other end connected to an input of the target measurement circuit 40112, and the first switch 40113 is configured to control on/off between the output of the $i^{th}$ timing error detector and the input of the target measurement circuit 40112. The second switch 40114 has one end connected to an output of the target measurement circuit 40112, and the other end connected to an input of the first subtracter 40115, and the second switch 40114 is configured to control on/off between the output of the target measurement circuit 40112 and the input of the first subtracter 40115. The first subtracter 40115 is configured to subtract the mean value from the $i^{th}$ original first signal to obtain the $i^{th}$ first signal.

In some exemplary embodiments, the timing recovery apparatus further includes an ADC, an adaptive equalizer, a slicer and an oscillator. The ADC is configured to sample received analog input signals according to a sampling frequency and a sampling phase to obtain a first digital signal. The adaptive equalizer is configured to perform equalization processing on the first digital signal to obtain a second digital signal. The slicer is configured to map the second digital signal to a corresponding output signal. The oscillator is configured to control the sampling phase of the ADC according to the fifth signal. The above N=2. The timing error detection module includes a first timing error detection unit and a second timing error detection unit. The first timing error detection unit is configured to determine a $1^{st}$ first signal of the N first signals according to the first digital signal and the output signal. The second timing error detection unit is configured to determine a $2^{nd}$ first signal of the N first signals according to the second digital signal and the output signal. This structure will be described in further detail below.

Figure 5:
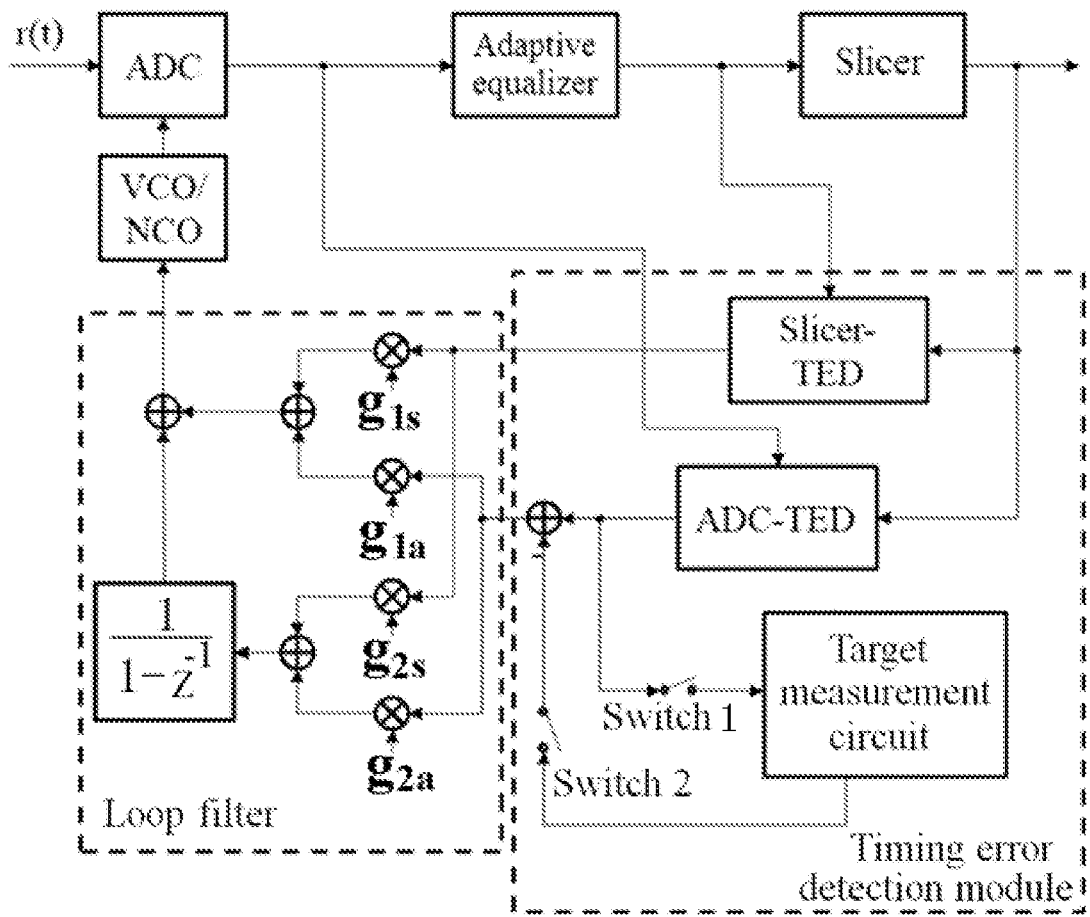
FIG. 5 is a schematic diagram of a timing recovery apparatus that uses two timing error detectors in combination according to an embodiment of the present application.

In some exemplary embodiments, the timing error detectors in different timing error detection units may be the same or different. For example, when N=2, the timing error detector in the $1^{st}$ timing error detection unit 4011a, i.e., the $1^{st}$ timing error detector 40111a, may be a Slicer-TED, and the timing error detector in the $2^{nd}$ timing error detection unit 4011b, i.e., the $2^{nd}$ timing error detector 40111b, may be an ADC-TED, as shown in FIG. 5. When the Slicer-TED and the ADC-TED are jointly used for timing recovery, since the loop filter has 2 input signals, i.e., output signals from the ADC-TED and the Slicer-TED, respectively, and 4 independently configurable gain parameters, the advantages of the Slicer-TED and the ADC-TED are fully combined. That is, with the advantages of the Slicer-TED, the timing recovery has less phase jitter, and with the advantages of the ADC-TED, the timing recovery is not influenced by the adaptive update of the equalization coefficient. As a result, the timing recovery apparatus has less phase jitter while being free of influences by the adaptive update of the equalization coefficient, thereby improving the performance of the timing recovery.

It should be noted that FIG. 5 shows merely a schematic diagram of a timing recovery apparatus which uses the Slicer-TED and the ADC-TED jointly for timing recovery as an example, which does not mean that only the Slicer-TED and the ADC-TED can be used jointly for timing recovery, and other solutions that apply two or more timing error detection units jointly for timing recovery are also within the protection scope of the embodiments of the present application.

It should be noted that the autocorrelation characteristics of the received signal remain unchanged during the timing recovery process. Alternatively, even if the autocorrelation characteristics of the received signal are changed, no great change occurs in a stable phase before and after a change in an autocorrelation characteristic of the received signal when the $i^{th}$ timing error detector is used for timing recovery, and then, it is enough that the $i^{th}$ timing error detection unit merely includes the $i^{th}$ timing error detector. If an autocorrelation characteristic of the received signal is changed during the timing recovery process, and a great change occurs in the stable phase before and after the change in the autocorrelation characteristic of the received signal when the $i^{th}$ timing error detector is used for timing recovery, and then, the $i^{th}$ timing error detection unit should include: the $i^{th}$ timing error detector, the target measurement circuit 40112, the first switch 40113, the second switch 40114, and the first subtracter 40115.

For example, when N=2, the timing error detector in the $1^{st}$ timing error detection unit 4011a is a Slicer-TED, and the timing error detector in the $2^{nd}$ timing error detection unit 4011b is an ADC-TED, since no great change occurs in a stable phase before and after a change in an autocorrelation characteristic of the received signal when the Slicer-TED is used for timing recovery, the $1^{st}$ timing error detection unit 4011a may merely include the Slicer-TED. However, since a great change occurs in the stable phase before and after the change in the autocorrelation characteristic of the received signal when the ADC-TED is used for timing recovery, the $2^{nd}$ timing error detection unit 4011b should further include, in addition to the ADC-TED, the target measurement circuit 40112, the first switch 40113, the second switch 40114 and the first subtracter 40115.

In some exemplary embodiments, the timing recovery apparatus further includes: an analog-to-digital converter (ADC) 403 configured to sample received analog input signals to obtain a first digital signal; an adaptive equalizer 404 configured to perform equalization processing on the first digital signal to obtain a second digital signal; and a slicer 405 configured to map the second digital signal to a corresponding output signal. In this case, the $i^{th}$ timing error detector is configured to: determine an $i^{th}$ original first signal according to the first digital signal and the output signal; or, determine an $i^{th}$ original first signal according to the second digital signal and the output signal.

For example, referring to FIG. 5, the ADC-TED determines the original first signal according to the first digital signal from the ADC and the output signal of the slicer, while the Slicer-TED determines the original first signal according to the second digital signal from the adaptive equalizer and the output signal of the slicer.

It should be noted that the $i^{th}$ timing error detector may also determine the $i^{th}$ original first signal based on other principles, and the specific principle for determining the $i^{th}$ original first signal is not intended to limit the scope of the embodiments of the present application.

In some exemplary embodiments, the analog-to-digital converter 403 is configured to: sample received analog input signals according to a sampling frequency and a sampling phase to obtain a first digital signal. Also, the timing recovery apparatus further includes: an oscillator 406 configured to control a sampling phase of the ADC according to the filtered timing error message.

In some exemplary embodiments, the sampling frequency of the ADC may be one, two, or other oversampling multiple of the symbol rate. In order to increase the accuracy of the decision symbol and reduce the bit error rate, an oversampling multiple is usually adopted.

In some exemplary embodiments, the oscillator 406 may be a voltage controlled oscillator (VCO) or a numerically controlled oscillator (NCO).

In the timing recovery apparatus provided in the embodiments of the present application, timing recovery is performed using N timing error messages jointly so that advantages and disadvantages of the N timing error messages are complemented to one another, and the performance of the timing recovery is improved. Further, N input signals of the loop filter are provided so that the loop filter has 2 N independent configurable gain parameters, and advantages of the N timing error messages can be fully combined, thereby further improving the performance of the timing recovery.

The following describes an example of jointly using the Slicer-TED and the ADC-TED for timing recovery to explain why the timing recovery apparatus of the present application can fully combine the advantages of N timing error messages.

Assuming that a $1^{st}$ gain parameter is $g_{1s}$, a $2^{nd}$ gain parameter is $g_{1a}$, a $3^{rd}$ gain parameter is $g_{2s}$, and a $4^{th}$ gain parameter is $g_{2a}$, the Slicer-TED outputs an original timing error message $e_{s(k)}$, the ADC-TED outputs an original timing error message $e_{a(k)}$, and a mean value of the original timing error message output from the ADC-TED is $\bar{e}$, then the output signal of the first adder may be expressed as: $g_{1a} \times (e_a(k)-\bar{e})+g_{1s} \times e_s(k)$, the output signal of the second adder (i.e., the input signal of the integrator) may be expressed as: $g_{2a} \times ((e_a(k)-\bar{e})+g_{2s} \times e_s(k)$.

To illustrate the advantages of the loop filter in the embodiments of the present application over the conventional loop filter, assuming, and for simplicity of illustration, $\bar{e}$ is neglected, then the output signal of the first adder is equivalently transformed into:

$$g_{1s} \times \left(\frac{g_{1a}}{g_{1s}} \times e_a(k) + e_s(k)\right),$$

and the output signal of the second adder is equivalently transformed into:

$$g_{2s} \times \left(\frac{g_{2a}}{g_{2s}} \times e_a(k) + e_s(k)\right).$$

In contrast, the output signal of the adder at the upper right corner of the conventional loop filter of FIG. 3 may be expressed as $g_1 \times (g_0 \times e_a(k)+e_s(k))$, and the input signal of the integrator may be expressed as $g_2 \times (g_0 \times e_a(k)+e_s(k))$.

Comparing the above four formulas, it can be seen that when the loop filter in the embodiments of the present application satisfies:

$$\frac{g_{1a}}{g_{1s}} = \frac{g_{2a}}{g_{2s}} = g_0',$$

the loop filter in the embodiments of the present application degrades into a conventional loop filter.

However, in the embodiments of the present application, the value of $g_{1a}$ can be reduced to suppress phase jitter caused by the large self-noise of the ADC-TED. In other words, when the gain parameters of the loop filter in the embodiments of the present application satisfy $$\frac{g_{1a}}{g_{1s}} < \frac{g_{2a}}{g_{2s}} = g_0',$$

the timing recovery apparatus in the embodiments of the present application has less phase jitter than the conventional timing recovery apparatus (including a conventional loop filter).

More specifically, ratios of $e_a(k)$ and $e_s(k)$ in FIG. 3 can be adjusted through $g_0'$ solely, and $e_a(k)$ and $e_s(k)$ take a same ratio in the ratio branch and the integral branch. However, in the embodiments of the present application, the ratios of $e_a(k)$ and $e_s(k)$ can be adjusted through $g_{1a}/g_{1s}$ in the ratio branch and through $g_{2a}/g_{2s}$ in the integral branch. In practice, to meet the requirement of a damping factor of the timing recovery loop, the ratio branch has a gain much larger than the integral branch. For example, $g_{1s}$ is much greater than $g_{2s}$. The larger self-noise of the ADC-TED is desired to be suppressed mainly in the ratio branch, that is, $g_{1a}/g_{1s}$ is set to be much smaller than 1 in the ratio branch, while in the integral branch, the advantage that the ADC-TED is not influenced by the adaptive update of the equalizer coefficients is utilized, that is, $g_{2a}/g_{2s}$ is set to a larger value in the integral branch.

In summary, by providing 2 N independently configurable gain parameters, the loop filter in the embodiments of the present application fully combines N timing error messages, for example, fully combines the advantages of the ADC-TED and the Slicer-TED, while suppresses their respective disadvantages, so that the timing recovery has less phase jitter, and is not influenced by adaptive update of the equalization coefficient.

Figure 6:
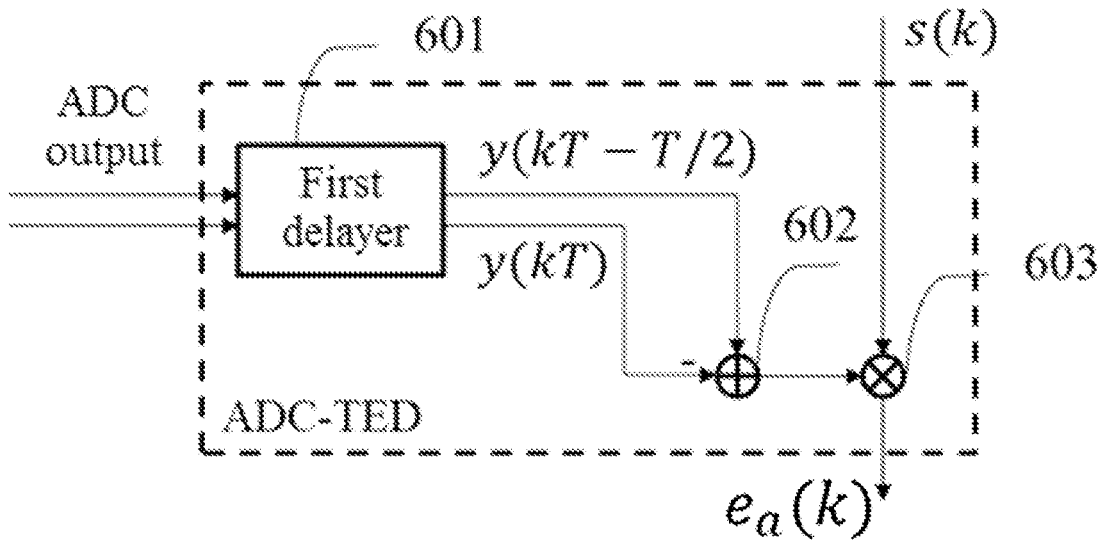
FIG. 6 is a schematic diagram of an ADC-TED according to an embodiment of the present application.

FIG. 6 is a schematic diagram of feasible circuitry of an ADC-TED. It should be noted that FIG. 6 is not intended to limit the specific implementation of the ADC-TED, nor is it intended to limit the scope of the embodiments of the present application. As shown in FIG. 6, the ADC-TED includes: a first delayer 601, a second subtracter 602 and a third multiplier 603. The first delayer 601 is configured to delay a first digital signal to obtain a third digital signal. If the sampling frequency is twice the symbol rate, two third digital signals are obtained. It should be noted that the delayer 601 functions to align the first digital signal with the output signal of a slicer. The second subtracter 602 is configured to perform subtraction operation on the two third digital signals to obtain a fourth digital signal. The third multiplier 603 is configured to multiply the fourth digital signal with the output signal of the slicer to obtain a timing error message, i.e., $$e_a(k) = s(k)\left[y\left(kT - \frac{T}{2}\right) - y(kT)\right],$$

where $e_a(k)$ is the timing error message output from the ADC-TED, s(k) is the output signal of the slicer, T is the sampling period, and y(kT) and y(kT–T/2) are the third digital signals.

Figure 7:
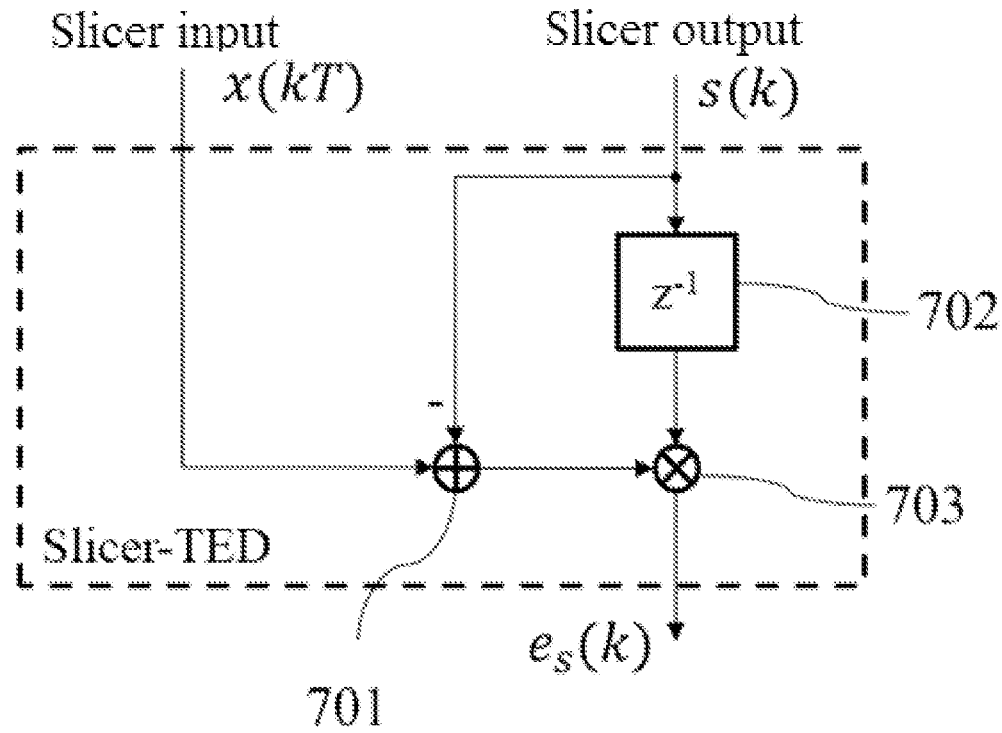
FIG. 7 is a schematic diagram of a Slicer-TED according to an embodiment of the present application.

FIG. 7 is a schematic diagram of feasible circuitry of a Slicer-TED. It should be noted that FIG. 7 is not intended to limit the specific implementation of the Slicer-TED, nor is it intended to limit the scope of the embodiments of the present application. As shown in FIG. 7, the Slicer-TED includes: a third subtracter 701, a second delayer 702 and a fourth multiplier 703. The third subtracter 701 is configured to subtract the second digital signal from the output signal of the slicer to obtain a fifth digital signal. The second delayer 702 is configured to delay the output signal of the slicer to obtain a delayed output signal. The fourth multiplier 703 is configured to multiply the fifth digital signal with the delayed output signal to obtain a timing error message, i.e., $e_s(k)=s(k-1)[x(kT)-s(k)]$, where x(kt) is the second digital signal, s(k) is the output signal of the slicer, and $e_s(k)$ is the timing error message output from the Slicer-TED.

Figure 8:
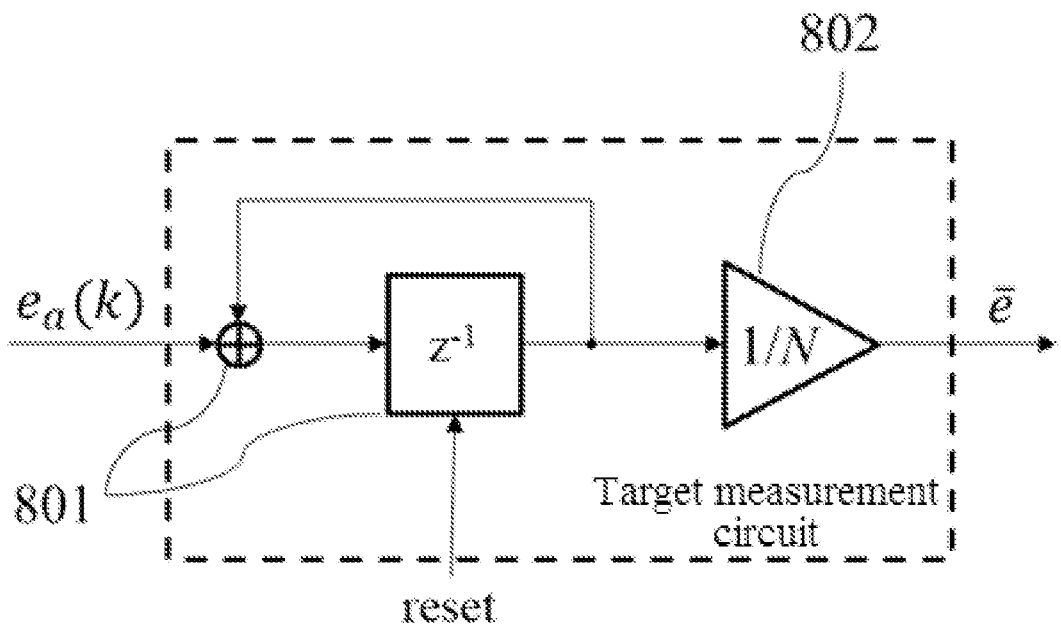
FIG. 8 is a schematic diagram of a target measurement circuit according to an embodiment of the present application.

FIG. 8 is a schematic diagram of feasible circuitry of a target measurement circuit. It should be noted that FIG. 8 is not intended to limit the specific implementation of the target measurement circuit, nor is it intended to limit the scope of the embodiments of the present application. As shown in FIG. 8, the target measurement circuit includes: an accumulator 801 and an amplifier 802. The accumulator 801 is configured to add up original first signals output at different time points from a timing error detector connected to the target measurement circuit so as to obtain an accumulated first signal. The amplifier 802 is configured to amplify the accumulated first signal by a factor of 1/n (i.e., to reduce the accumulated first signal by a factor of n) to obtain a mean value of the original first signals, i.e., $$\bar{e} = \frac{1}{n}\sum_{k=1}^{n} e_a(k),$$

where n is a number of the accumulated original first signals.

Figure 9:
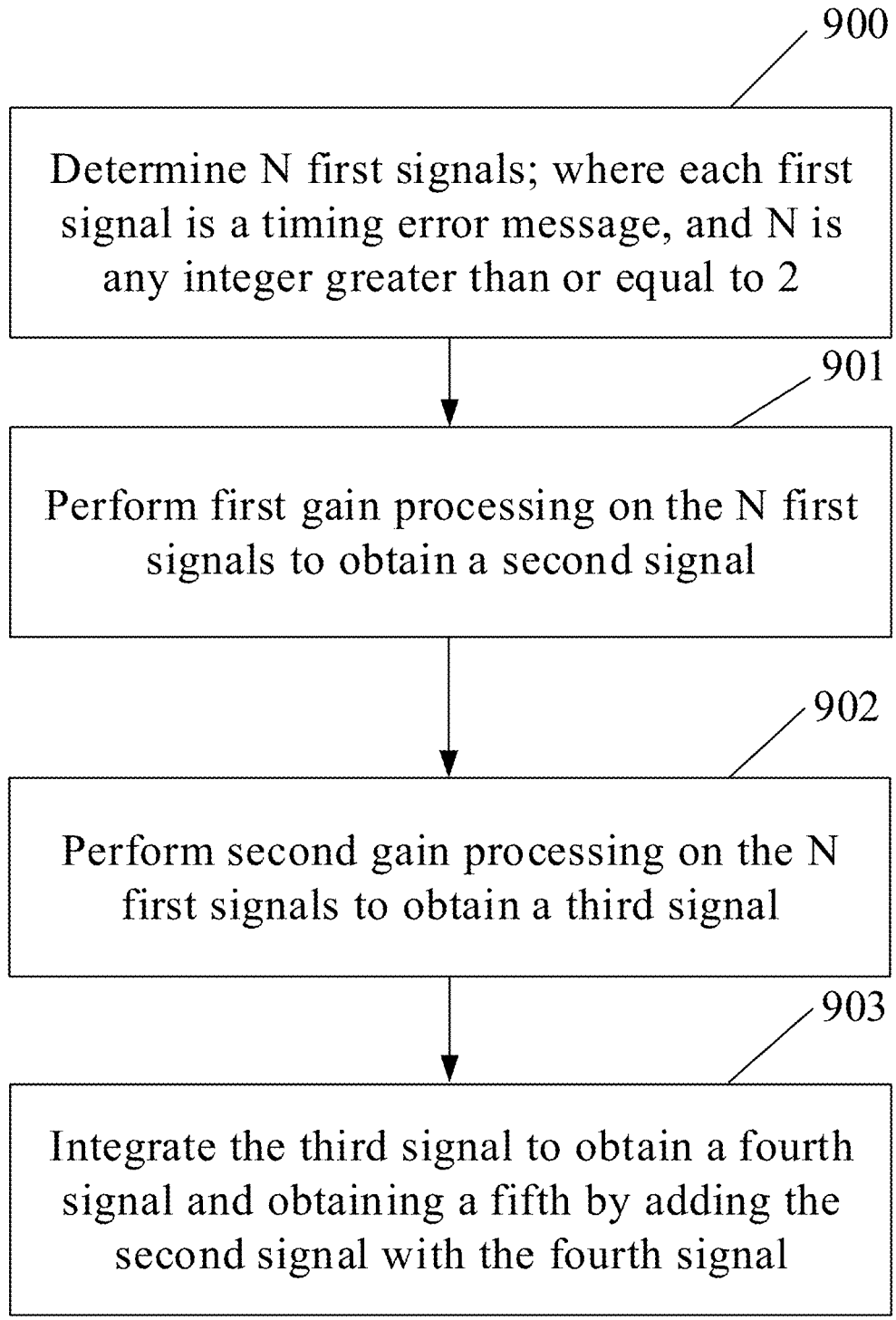
FIG. 9 is a flowchart of a timing recovery method according to another embodiment of the present application.

FIG. 9 is a flowchart of a timing recovery method according to another embodiment of the present application.

According to a third aspect and referring to FIG. 9, another embodiment of the present application provides a timing recovery method, which includes the following operations 900 to 903.

At operation 900, determining N first signals; where each first signal is a timing error message, and N is any integer greater than or equal to 2.

In some exemplary embodiments, before determining the N first signals, the method further includes: sampling received analog input signals to obtain a first digital signal; performing equalization processing on the first digital signal to obtain a second digital signal; and mapping the second digital signal to a corresponding output signal.

Accordingly, determining the N first signals includes: determining an $i^{th}$ first signal from the first digital signal and the output signal; or, determining the $i^{th}$ first signal from the second digital signal and the output signal; where i is any integer greater than or equal to 1 and less than or equal to N.

Apparently, the $i^{th}$ first signal may also be determined in other manners, and the specific determining manner is not intended to limit the protection scope of the embodiments of the present application, and the embodiments of the present application emphasize that the advantages of the N first signals are sufficiently combined and thus the performance of timing recovery is improved.

At operation 901, performing first gain processing on the N first signals to obtain a second signal.

In some exemplary embodiments, performing first gain processing on the N first signals to obtain the second signal includes: multiplying a $j^{th}$ first signal by a $j^{th}$ gain parameter to obtain a $j^{th}$ fourth signal; where j is any integer greater than or equal to 1 and less than or equal to N; and adding up N fourth signals to obtain the second signal.

At operation 902, performing second gain processing on the N first signals to obtain a third signal.

In some exemplary embodiments, performing second gain processing on the N first signals to obtain the third signal includes: multiplying a $j^{th}$ first signal by a $(j+N)^{th}$ gain parameter to obtain a $j^{th}$ fifth signal; where j is any integer greater than or equal to 1 and less than or equal to N; and adding up N fifth signals to obtain the third signal.

At operation 903, integrating the third signal to obtain a fourth signal and obtaining a fifth signal, i.e., a filtered timing error message, by adding the second signal with the fourth signal.

In some exemplary embodiments, sampling the received analog input signals includes: sampling the received analog input signals according to a sampling frequency and a sampling phase.

Accordingly, the method further includes: controlling the sampling phase according to the filtered timing error message.

In the timing recovery method provided in the embodiments of the present application, timing recovery is performed using N timing error messages jointly so that advantages and disadvantages of the N timing error messages are complemented, and the performance of the timing recovery is improved. Moreover, N input signals of the loop filter are provided so that the loop filter has 2 N independent configurable gain parameters, and advantages of the N timing error messages can be fully combined, thereby further improving the performance of the timing recovery.

Figure 10:
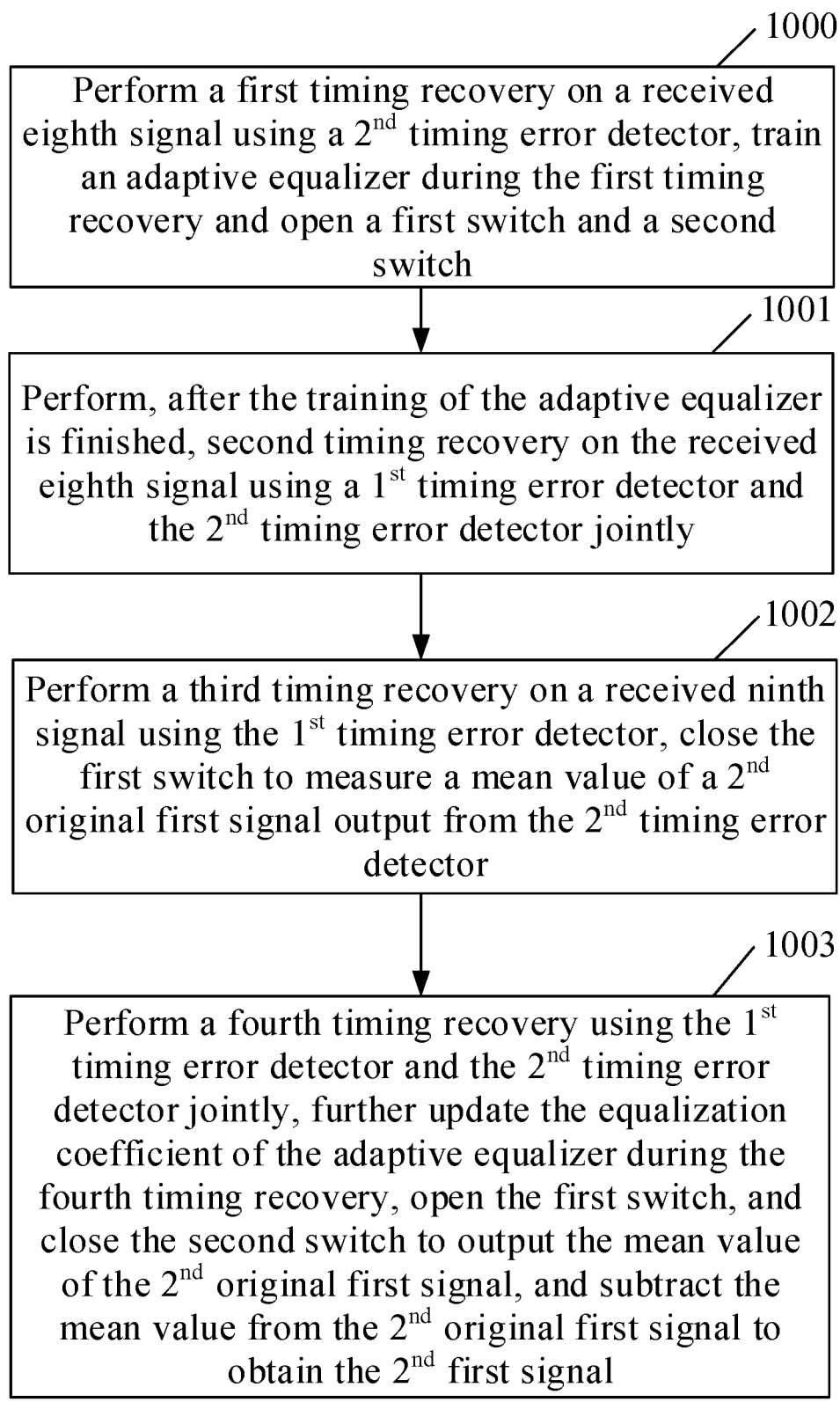
FIG. 10 is a flowchart of a timing recovery method according to another embodiment of the present application.

FIG. 10 is a flowchart of a timing recovery method according to another embodiment of the present application.

According to a fourth aspect and referring to FIG. 10, another embodiment of the present application provides a timing recovery method applied to any timing recovery apparatus as described above, where N is 2. The timing recovery apparatus includes: a timing error detection module and a loop filter.

In some exemplary embodiments, a $1^{st}$ timing error detector may be a Slicer-TED, and a $2^{nd}$ timing error detector may be an ADC-TED. Apparently, other timing error detectors are also possible, and the specific timing error detectors are not intended to limit the scope of the embodiments of the present application.

The method includes the following operations 1000 to 1003.

At operation 1000, performing a first timing recovery on a received eighth signal using a $2^{nd}$ timing error detector, so that a sampling phase of an analog-to-digital converter is converged to a first target phase, training an adaptive equalizer during the first timing recovery, and opening a first switch and a second switch.

In some exemplary embodiments, an execution time may be set for the first timing recovery, within which the first timing recovery is performed, and when the set time expires, the adaptive equalizer is considered to be trained, and the sampling phase of the ADC is considered to be converged to a first target phase, that is, a next process, i.e., the second timing recovery, may be started.

In some exemplary embodiments, the eighth signal may be a PAM2 training signal of THP, or may be a PAM training signal of THP with a higher level, or may be a signal that uses another precoding technique, or may be a signal that uses another pre-equalization technique, or may be any other signal, as long as the eighth signal has an autocorrelation characteristic different from the ninth signal. The specific form of the eighth signal is not limited in the embodiments of the present application, and is not intended to limit the protection scope of the embodiments of the present application.

In some exemplary embodiments, when the first timing recovery is performed on the received eighth signal using the $2^{nd}$ timing error detector, a $1^{st}$ gain parameter and a $3^{rd}$ gain parameter are both set to 0, while a $2^{nd}$ gain parameter and a $4^{th}$ gain parameter are both set to be greater than 0. The purpose of setting the $1^{st}$ gain parameter and the $3^{rd}$ gain parameter both to 0 is to disable the $1^{st}$ timing error detector. For example, $g_{1s}$ and $g_{2s}$ in FIG. 5 are set to 0. The purpose of setting the $2^{nd}$ gain parameter and the $4^{th}$ gain parameter both to be greater than 0 is to enable the $2^{nd}$ timing error detector. For example, $g_{1a}$ and $g_{2a}$ in FIG. 5 are both set to be greater than 0.

At operation 1001, performing, after the training of the adaptive equalizer is finished, second timing recovery on the received eighth signal using a $1^{st}$ timing error detector and the $2^{nd}$ timing error detector jointly, so that the sampling phase of an analog-to-digital converter is converged to a second target phase.

In some exemplary embodiments, an execution time may be set for the second timing recovery, within which the second timing recovery is performed, and when the set time expires, the sampling phase of the ADC is considered to be converged to a second target phase, that is, a next process, i.e., the third timing recovery, may be started.

In some exemplary embodiments, the second timing recovery is performed using the $1^{st}$ timing error detector and the $2^{nd}$ timing error detector jointly, and the $1^{st}$, $2^{nd}$, $3^{rd}$ and $4^{th}$ gain parameters are all set to be greater than 0. The purpose of setting the $1^{st}$, $2^{nd}$ $3^{rd}$ and $4^{th}$ gain parameters all to be greater than 0 is to enable both the $1^{st}$ timing error detector and the $2^{nd}$ timing error detector. For example, $g_{1s}$, $g_{2s}$, $g_{1a}$ and $g_{2a}$ in FIG. 5 are all set to be greater than 0.

At operation 1002, performing a third timing recovery on a received ninth signal using the $1^{st}$ timing error detector, updating the equalization coefficient of the adaptive equalizer is stopped during the third timing recovery, closing the first switch to measure a mean value of a $2^{nd}$ original first signal output from the $2^{nd}$ timing error detector, where the ninth signal has an autocorrelation characteristic different from the eighth signal.

In some exemplary embodiments, an execution time may be set for the third timing recovery, within which the third timing recovery is performed, and when the set time expires, the measurement of the mean value of the $2^{nd}$ original first signal output from the $2^{nd}$ timing error detector is considered to be completed, that is, a next process, i.e., the fourth timing recovery, may be started.

In some exemplary embodiments, the ninth signal may be a PAM16 data signal of THP, or may be a PAM data signal of THP with a higher level, or may be a signal that uses another precoding technique, or may be a signal that uses another pre-equalization technique, or may be any other signal, as long as the eighth signal has an autocorrelation characteristic different from the ninth signal. The specific form of the ninth signal is not limited in the embodiments of the present application, and is not intended to limit the protection scope of the embodiments of the present application.

In some exemplary embodiments, when the third timing recovery is performed on the received ninth signal using the $1^{st}$ timing error detector, the $3^{rd}$ gain parameter and the $4^{th}$ gain parameter are both set to 0, while the $1^{st}$ gain parameter and the $2^{nd}$ gain parameter are both set to be greater than 0. The purpose of setting the $3^{rd}$ gain parameter and the $4^{th}$ gain parameter both to 0 is to disable the $2^{nd}$ timing error detector. For example, $g_{1a}$ and $g_{2a}$ in FIG. 5 are both set to 0. The purpose of setting the $1^{st}$ gain parameter and the $2^{nd}$ gain parameter both to be greater than 0 is to enable the $1^{st}$ timing error detector. For example, $g_{1s}$ and $g_{2s}$ in FIG. 5 are both set to be greater than 0.

In some exemplary embodiments, if the value of the accumulator of the target measurement circuit is not 0 before the first switch is closed, the first switch is desired to be closed after clearing the accumulator of the target measurement circuit.

In some exemplary embodiments, performing the third timing recovery on the received ninth signal using the $1^{st}$ timing error detector is out of the reason that the $1^{st}$ timing error detector extracts the $1^{st}$ original first signal based on the second digital signal output from the adaptive equalizer, and the ISI of the second digital signal tends to be 0, so that no great change occurs in a stable phase before and after a change in the autocorrelation characteristic of the received signal, that is, the stable phase is still stabilized in the target phase.

In some exemplary embodiments, the purpose of updating the equalization coefficient of the adaptive equalizer is stopped during the third timing recovery is to make the $1^{st}$ timing error detector not influenced by the adaptive update of the equalization coefficient, so as to improve the performance of timing recovery, and thus ensure that the sampling phase of the ADC is stabilized at the target phase.

In some exemplary embodiments, since the mean value of the original first signal output from the $2^{nd}$ timing error detector is no longer 0 when the autocorrelation characteristic of the received signal changes, the corresponding mean value is subtracted from the original first signal output from the $2^{nd}$ timing error detector, and then the result is output to the loop filter. In other words, the mean value of the original first signal output from the $2^{nd}$ timing error detector is desired to be measured to ensure that the sampling phase is stabilized at the target phase.

At operation 1003, after measuring the mean value of the $2^{nd}$ original first signal output from the $2^{nd}$ timing error detector, performing a fourth timing recovery using the $1^{st}$ timing error detector and the $2^{nd}$ timing error detector jointly, further updating the equalization coefficient of the adaptive equalizer during the fourth timing recovery, opening the first switch, and closing the second switch to output the mean value of the $2^{nd}$ original first signal, and subtracting the mean value from the $2^{nd}$ original first signal to obtain the $2^{nd}$ first signal.

In some exemplary embodiments, when the fourth timing recovery is performed using the $1^{st}$ timing error detector and the $2^{nd}$ timing error detector jointly, the $1^{st}$, $2^{nd}$, $3^{rd}$ and $4^{th}$ gain parameters are all set to be greater than 0. The purpose of setting the $1^{st}$, $2^{nd}$, $3^{rd}$ and $4^{th}$ gain parameters all to be greater than 0 is to enable both the $1^{st}$ timing error detector and the $2^{nd}$ timing error detector. For example, $g_{1s}$, $g_{2s}$, $g_{1a}$ and $g_{2a}$ in FIG. 5 are all set to be greater than 0.

In the timing recovery method provided in the embodiments of the present application, after the sampling phase of the analog-to-digital converter is stabilized at the target phase, merely the $1^{st}$ timing error detector is used to perform the third timing recovery on the received ninth signal, and since the $1^{st}$ timing error detector extracts the $1^{st}$ original timing error message based on the second digital signal output from the adaptive equalizer, the ISI of the second digital signal tends to be 0, so that no great change occurs in a stable phase before and after a change in the autocorrelation characteristic of the received signal, that is, the stable phase is still stabilized in the target phase. Moreover, updating the equalization coefficient of the adaptive equalizer is stopped during the third timing recovery, so that the $1^{st}$ timing error detector is not influenced by the adaptive update of the equalization coefficient of the adaptive equalizer, and the sampling phase of the analog-to-digital converter is still stabilized in the target phase during the third timing recovery. Therefore, the target measurement is carried out during the third timing recovery so that the target measurement can last for a longer time with a higher precision.

Those of ordinary skill in the art will appreciate that all or some operations of the above described method, functional modules/units in the system and apparatus may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or operation may be performed cooperatively by several physical components. Some or all physical components may be implemented as software executed by a processor, such as a CPU, a digital signal processor or microprocessor, or implemented as hardware, or implemented as an integrated circuit, such as an application specific integrated circuit. Such software may be distributed on a computer-readable medium which may include a computer storage medium (or non-transitory medium) and communication medium (or transitory medium). As is well known to those of ordinary skill in the art, the term computer storage medium includes volatile and nonvolatile, removable and non-removable medium implemented in any method or technology for storing information, such as computer-readable instructions, data structures, program modules or other data. The computer storage medium includes, but is not limited to, an RAM, an ROM, an EEPROM, a flash or any other memory technology, a CD-ROM, a digital versatile disc (DVD) or any other optical disc storage, a magnetic cartridge, a magnetic tape, a magnetic disk storage or any other magnetic memories, or may be any other medium used for storing the desired information and accessible by a computer. Moreover, it is well known to those ordinary skilled in the art that a communication medium typically includes a computer-readable instruction, a data structure, a program module, or other data in a modulated data signal, such as a carrier wave or other transport mechanism, and may include any information delivery medium.

The present disclosure has disclosed exemplary embodiments, and although specific terms are employed, they are used and should be interpreted merely in a generic and descriptive sense, not for purposes of limitation. In some instances, as would be apparent to one skilled in the art, features, characteristics and/or elements described in connection with a particular embodiment may be used alone or in combination with features, characteristics and/or elements described in connection with another embodiment, unless expressly stated otherwise. It will, therefore, be understood by those skilled in the art that various changes in form and details may be made therein without departing from the scope of the present application as set forth in the appended claims.

What is claimed is:

1. A timing recovery apparatus comprising: a timing error detection module and a loop filter;

wherein the timing error detection module is configured to determine N first signals, and input the N first signals to N input terminals of the loop filter; wherein each of the N first signals is a timing error message, and N is any integer greater than or equal to 2;

wherein the loop filter comprises: the N input terminals, a source filter, a first gain processing module, and a second gain processing module;

the N input terminals are configured to receive the N first signals;

the source filter comprises: an integral signal terminal and an addition terminal;

the first gain processing module is configured to perform first gain processing on the N first signals to obtain a second signal, and output the second signal to the addition terminal;

the second gain processing module is configured to perform second gain processing on the N first signals to obtain a third signal, and output the third signal to the integral signal terminal; and the source filter is configured to integrate the third signal received by the integral signal terminal to obtain a fourth signal, and obtain a fifth signal according to the fourth signal and the second signal received by the addition terminal;

wherein the first gain processing module comprises: N first multipliers and a first adder; and the second gain processing module comprises: N second multipliers and a second adder, wherein for each j in [1 ... N], a $j^{th}$ first multiplier of the N first multipliers is configured to multiply a $j^{th}$ first signal of the N first signals by a $j^{th}$ gain parameter to obtain a $j^{th}$ sixth signal; a $j^{th}$ second multiplier of the N second multipliers is configured to multiply the $j^{th}$ first signal of the N first signals by a $(j+N)^{th}$ gain parameter to obtain a $j^{th}$ seventh signal, wherein the first adder is configured to add up N sixth signals obtained by the N first multipliers to obtain the second signal, wherein the second adder is configured to add up N seventh signals obtained by the N second multipliers to obtain the third signal, wherein the timing error detection module comprises: N timing error detection units, wherein an $i^{th}$ timing error detection unit of the N timing error detection units is configured to determine an $i^{th}$ first signal; where i is any integer greater than or equal to 1 and less than or equal to N, and wherein the $i^{th}$ timing error detection unit comprises: an $i^{th}$ timing error detector, a target measurement circuit, a first switch, a second switch and a first subtracter, wherein the $i^{th}$ timing error detector is configured to determine an $i^{th}$ original first signal;

the target measurement circuit is configured to measure a mean value of the $i^{th}$ original first signal;

the first switch has one end connected to an output of the $i^{th}$ timing error detector, and the other end connected to an input of the target measurement circuit, and the first switch is configured to control on/off between the output of the $i^{th}$ timing error detector and the input of the target measurement circuit;

the second switch has one end connected to an output of the target measurement circuit, and the other end connected to an input of the first subtracter, and the second switch is configured to control on/off between the output of the target measurement circuit and the input of the first subtracter; and the first subtracter is configured to subtract the mean value from the $i^{th}$ original first signal to obtain the $i^{th}$ first signal.

2. The timing recovery apparatus according to claim 1, wherein the source filter further comprises: an integrator and a third adder; wherein the integrator is configured to integrate the third signal to obtain the fourth signal; and the third adder is configured to add the second signal and the fourth signal to obtain the fifth signal.

3. The timing recovery apparatus according to claim 1, wherein $k^{th}$ timing error detection unit of the N timing error detection units comprises: a $k^{th}$ timing error detector configured to determine a $k^{th}$ original first signal as the $k^{th}$ first signal of the N first signals, where k is an integer that is greater than or equal to 1 and less than or equal to N, and not equivalent to i.

4. The timing recovery apparatus according to claim 3, further comprising: an analog-to-digital converter (ADC), an adaptive equalizer, a slicer and an oscillator; wherein the ADC is configured to sample received analog input signals according to a sampling frequency and a sampling phase to obtain a first digital signal;

the adaptive equalizer is configured to perform equalization processing on the first digital signal to obtain a second digital signal;

the slicer is configured to map the second digital signal to a corresponding output signal;

the oscillator is configured to control the sampling phase of the ADC according to the fifth signal;

where N=2, k=1 and i=2;

and the $k^{th}$ timing error detection unit is configured to determine a $k^{th}$ first signal of the N first signals according to the second digital signal and the output signal of the slicer, and the $i^{th}$ timing error detection unit is configured to determine the $i^{th}$ first signal of the N first signals according to the first digital signal and the output signal of the slicer.

5. A timing recovery method applied to the timing recovery apparatus according to claim 4, the method comprising:

performing a first timing recovery on a received eighth signal using the $i^{th}$ timing error detector, so that a sampling phase of the ADC is converged to a first target phase, training the adaptive equalizer during the first timing recovery, and opening the first switch and the second switch;

performing, after the training of the adaptive equalizer is finished, a second timing recovery on the received eighth signal using the $k^{th}$ timing error detector and the $i^{th}$ timing error detector jointly, so that the sampling phase of the ADC is converged to a second target phase;

performing a third timing recovery on a received ninth signal using the $k^{th}$ timing error detector, stopping updating an equalization coefficient of the adaptive equalizer during the third timing recovery, and closing the first switch to measure a mean value of the $i^{th}$ original first signal output from the $i^{th}$ timing error detector; wherein the ninth signal has an autocorrelation characteristic different from the eighth signal; and after measuring the mean value of the $i^{th}$ original first signal output from the $i^{th}$ timing error detector, performing a fourth timing recovery using the $k^{th}$ timing error detector and the $i^{th}$ timing error detector jointly, further updating the equalization coefficient of the adaptive equalizer during the fourth timing recovery, opening the first switch, and closing the second switch to output the mean value of the $i^{th}$ original first signal, and subtracting the mean value from the $i^{th}$ original first signal to obtain the $i^{th}$ first signal.

6. A timing recovery method applied to the timing recovery apparatus according to claim 1, the method comprising:
   determining, by the timing error detection module, the N first signals;
   performing, by the first gain processing module, the first gain processing on the N first signals to obtain the second signal;
   performing, by the second gain processing module, the second gain processing on the N first signals to obtain the third signal; and
   integrating, by the source filter, the third signal to obtain the fourth signal and obtaining, by the source filter, the fifth signal according to the second signal and the fourth signal.

* * * * *